(12) United States Patent
Zhao

(10) Patent No.: US 8,239,696 B2
(45) Date of Patent: Aug. 7, 2012

(54) POWER SUPPLY CIRCUIT OF PORTABLE COMPUTER

(75) Inventor: Xiang-Ming Zhao, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 422 days.

(21) Appl. No.: 12/605,383

(22) Filed: Oct. 26, 2009

(65) Prior Publication Data

US 2011/0055599 A1 Mar. 3, 2011

(30) Foreign Application Priority Data

Aug. 31, 2009 (CN) .......................... 2009 1 0306363

(51) Int. Cl.
*G06F 1/26* (2006.01)
(52) U.S. Cl. ........................................................ 713/300
(58) Field of Classification Search ........... 713/300–340
See application file for complete search history.

(56) References Cited

U.S. PATENT DOCUMENTS

| | | | | | |
|---|---|---|---|---|---|
| 5,604,708 | A | * | 2/1997 | Helms et al. | 365/229 |
| 5,784,626 | A | * | 7/1998 | Odaohara | 713/300 |
| 5,832,282 | A | * | 11/1998 | Pate et al. | 713/300 |
| 6,167,289 | A | * | 12/2000 | Ball et al. | 455/572 |
| 6,865,690 | B2 | * | 3/2005 | Kocin | 714/14 |
| 7,409,571 | B2 | * | 8/2008 | Wulff | 713/330 |
| 7,535,196 | B2 | * | 5/2009 | Nagasawa | 320/114 |
| 7,789,685 | B2 | * | 9/2010 | Hickam | 439/188 |
| 8,001,419 | B2 | * | 8/2011 | Killian et al. | 714/14 |

* cited by examiner

*Primary Examiner* — Paul R Myers
*Assistant Examiner* — Trisha Vu
(74) *Attorney, Agent, or Firm* — Altis Law Group, Inc.

(57) ABSTRACT

A power supply circuit for supplying electric power to a portable computer includes a main battery, a first control circuit, a backup battery and a second control circuit. The main battery includes a first output terminal and a second output terminal shorter than the first output terminal. When the main battery is drawn out of the portable computer, a disconnection between the second output terminal and the portable computer occurs earlier than a disconnection between the first output terminal and the portable computer to from a time difference between the two disconnections. During this time difference, the main battery is controlled by the first control circuit to change from supplying electric power to the portable computer to not supplying electric power to the portable computer, and the backup battery is controlled by the second control circuit to supply electric power to the portable computer instead of the main battery.

8 Claims, 3 Drawing Sheets

POWER SUPPLY CIRCUIT OF PORTABLE COMPUTER

BACKGROUND

1. Technical Field

The disclosure relates to power supply circuits, and particularly to a power supply circuit for supplying electric power to a portable computer.

2. Description of Related Art

As our world becomes more technologically advanced, the demand for electrical power becomes more sophisticated. Conventionally, portable computers, such as laptop and notebook computers, are powered either through an AC adapter or through a rechargeable battery, such as a nickel cadmium (NiCd) battery or a nickel metal hydride (NiMH) battery. The AC adapter needs to be connected to a fixed electrical outlet via electrical lines and thus is not convenient for outdoor use. As batteries continue to be designed and developed to have greater capacity, the use of batteries to power portable computers has become increasingly common.

If a user anticipates to operate the portable computer for an extended period of time where AC power source is unavailable, the user typically provides one or more charged backup batteries. The portable computer normally has a function for displaying a remaining capacity of the main battery to the user. If the remaining capacity of the main battery is less than a preset value, the user is warned of a low battery condition. At this time, the user can draw the main battery out of the portable computer and install the backup battery into the portable computer, to avoid a sudden shutdown of the portable computer during use and obtain an extended use period.

However, when replacing the main battery, firstly, the portable computer must be manually shut down and the battery drawn out. Then the portable computer must be restarted after the backup battery is installed. Otherwise, information such as the datas that files are saved may be lost. Thus, replacing the main battery is troublesome and inconvenient for the user.

It is thus desirable to provide a portable computer with a power supply circuit which can overcome the described limitations.

DETAILED DESCRIPTION

Reference will now be made to the drawings to describe the present power supply circuit in detail.

Figure 1:
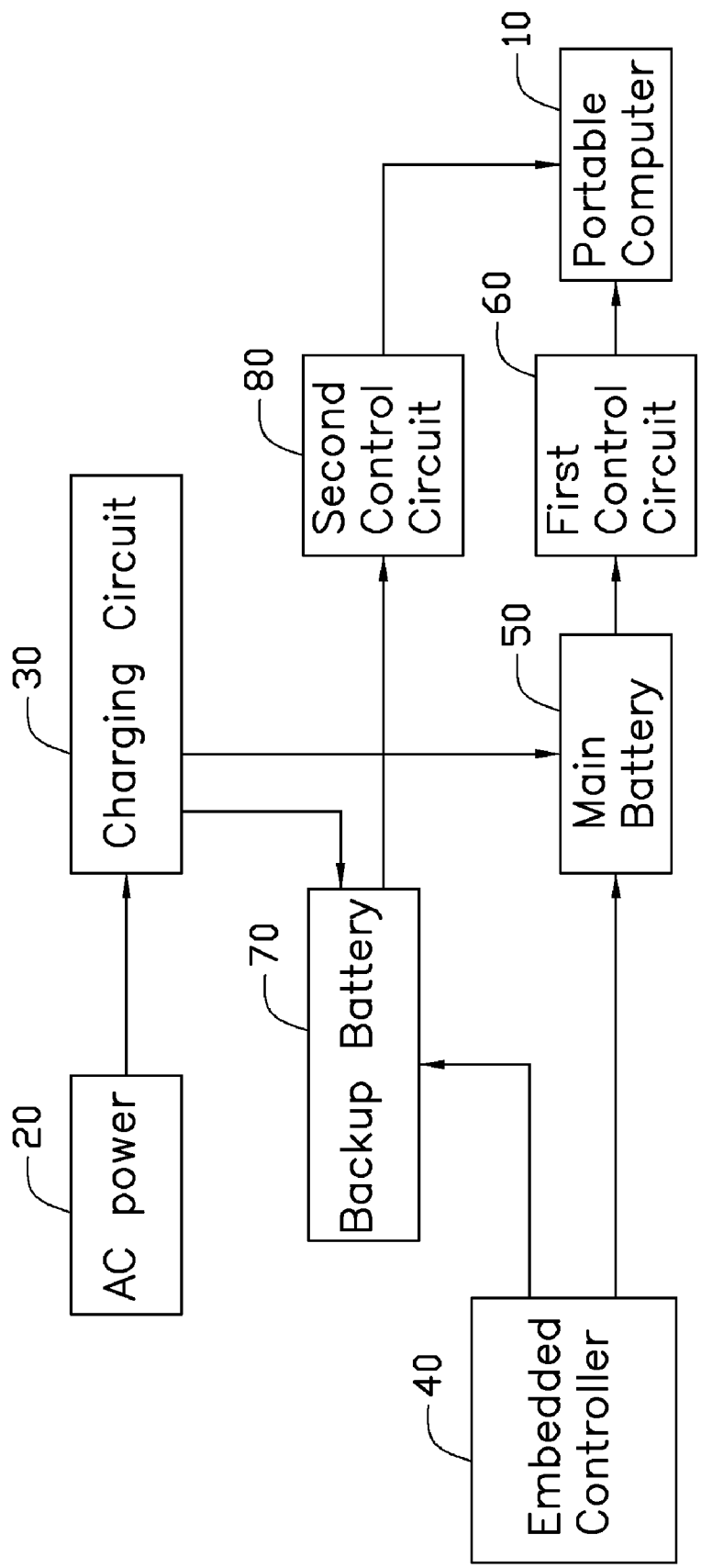
FIG. 1 is a functional block diagram of a power supply circuit of a portable computer in accordance with an exemplary embodiment of the present invention.

Referring to FIG. 1, a functional block diagram of a power supply circuit for supplying electric power to a portable computer 10 according to an exemplary embodiment of the present invention is shown. The power supply circuit includes an AC power source 20, a charging circuit 30, an embedded controller 40, a main battery 50, a first control circuit 60, a backup battery 70 and a second control circuit 80.

Figure 2:
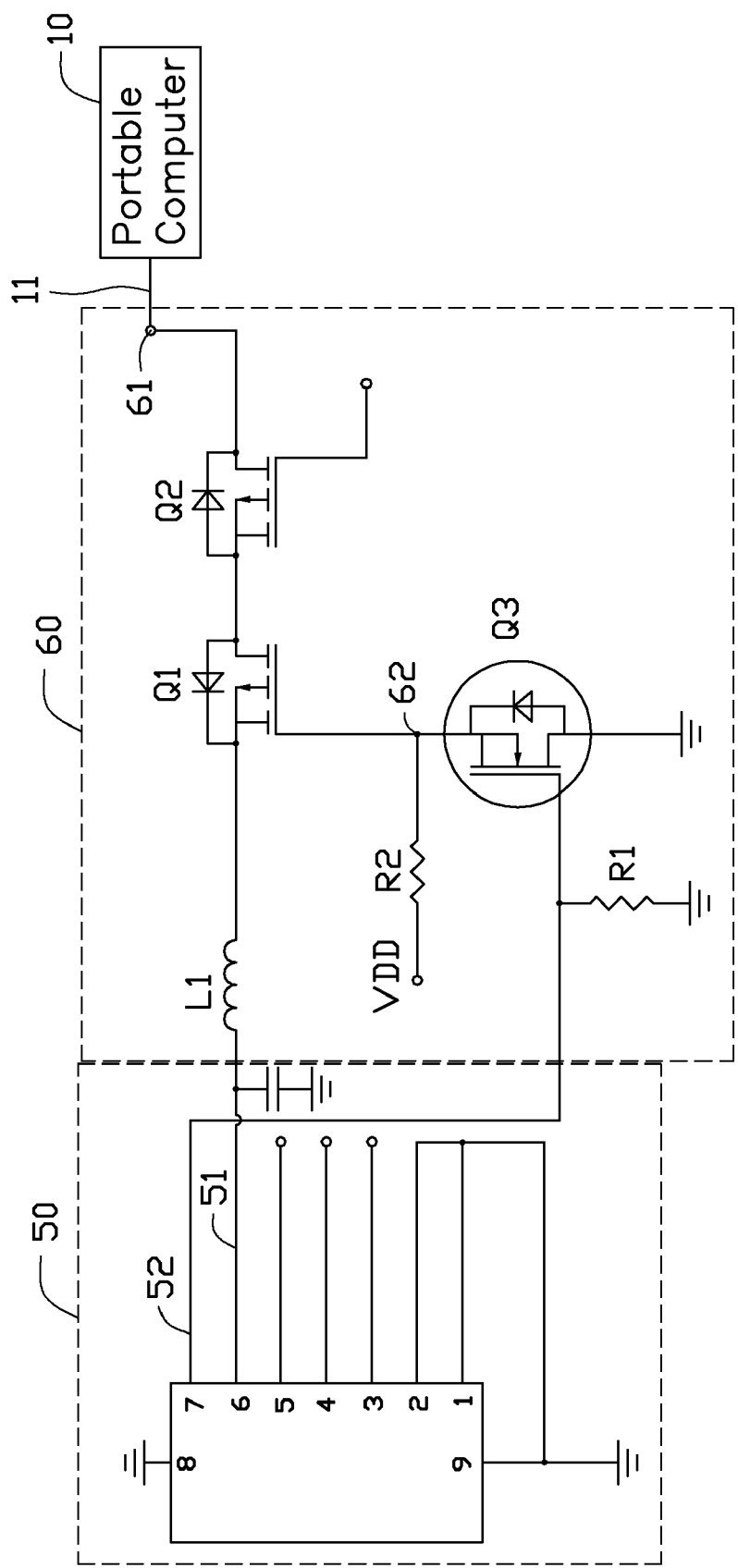
FIG. 2 is a schematic view showing a circuit for supplying electric power to the portable computer via a main battery.
Figure 3:
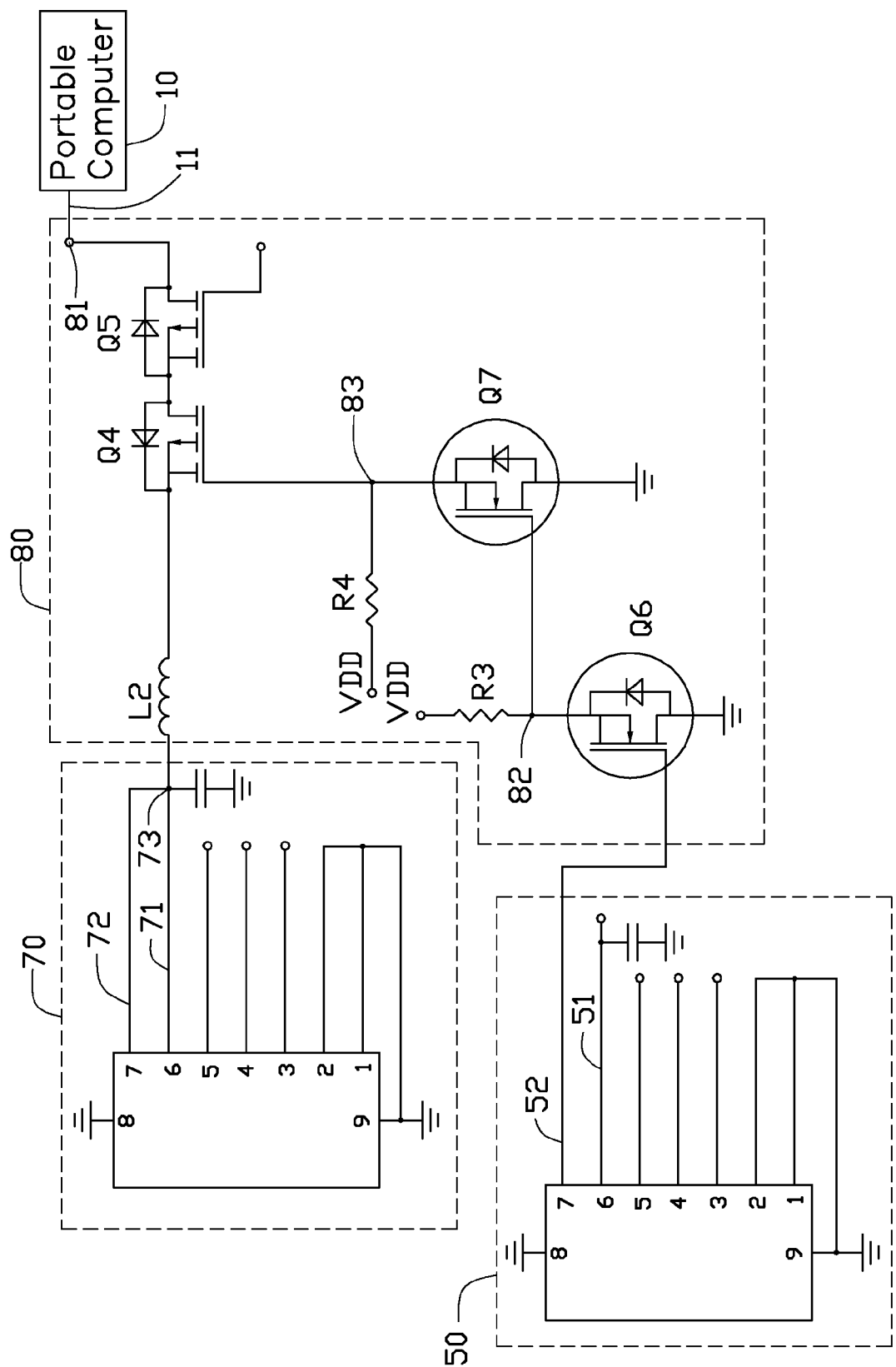
FIG. 3 is a schematic view showing a circuit for supplying electric power to the portable computer via a backup battery.

The portable computer 10 includes a main body, which defines a first trough (or compartment) (not shown) for the main battery 50 to be detachably mounted therein, and a second trough (or compartment) (not shown) for the backup battery 70 to be mounted therein. Referring also to FIGS. 2 and 3, each of the main battery 50 and the backup battery 70 includes seven electric pins all at a long side thereof. The seven electric pins are in sequence a first electric pin, a second electric pin, a third electric pin, a fourth electric pin, a fifth electric pin, a sixth electric pin and a seventh electric pin. The first and second electric pins of both of the main battery 50 and the backup battery 70 are electrically connected to ground. The third electric pin of the main battery 50 and the backup battery 70 are extended functional terminals, which are used for expansion functions of the main battery 50 and the backup battery 70. The fourth and fifth electric pins of each of the main battery 50 and the backup battery 70 are electrically connected to the embedded controller 40. When the main battery 50 and the backup battery 70 are installed into the first and second troughs of the portable computer 10, the embedded controller 40 can read information, such as an electric capacity and a remaining capacity of the main battery 50 and the backup battery 70 from the fourth and fifth pins, respectively. The sixth and seventh electric pins of the main battery 50 are connected to the portable computer 10 via the first control circuit 60 and function as first and second output terminals 51, 52 to supply electric power to the portable computer 10. Similarly, the sixth and seventh electric pins of the backup battery 70 are connected to the portable computer 10 via the second control circuit 80 and function as first and second output terminals 71, 72 for outputting electric power to the portable computer 10 when the main battery 50 is not in use. The second output terminal 52 of the main battery 50 is shorter than the first output terminal 51 of the main battery 50. The first and the second output terminals 71, 72 of the backup battery 70 are electrically connected to each other to form a first junction 73.

Each of the main battery 50 and the backup battery 70 further includes an eighth mounting pin and a ninth mounting pin at two opposite short sides thereof. The eighth and the ninth mounting pins of the main battery 50 are used for mechanically fixing the main battery 50 in the first trough of the portable computer 10. The eighth and the ninth mounting pins of the backup battery 70 are used for mechanically fixing the backup battery 70 in the second trough of the portable computer 10. When the main battery 50 and the backup battery 70 are respectively fixed in the first trough and the second trough, the eighth and the ninth mounting pins are electrically connected to ground.

Referring to FIG. 2, the first control circuit 60 includes a first and a second MOSFETs (metal-oxide-semiconductor field effect transistors) Q1, Q2 electrically connected to the first output terminal 51 of the main battery 50, a third MOSFET Q3 electrically connected to the second output terminal 52 of the main battery 50, a first resistor R1 and a second resistor R2. The first and second MOSFETs Q1, Q2 are both P-channel enhancement mode MOSFETs. The P-channel enhancement mode MOSFET has a negative threshold voltage. When an absolute value of a negative voltage applied between the gate and the source of the P-channel enhancement mode MOSFET is larger than the absolute value of the negative threshold voltage of the P-channel enhancement mode MOSFET, the P-channel enhancement mode MOSFET is turned on. When two P-channel enhancement mode MOSFETs have common sources, if the absolute value of the negative voltage applied between the gate and the drain of one of the P-channel enhancement mode MOSFETs is larger than the absolute value of the negative threshold voltage of the P-channel enhancement mode MOSFET, the drains and the sources of the two P-channel enhancement mode MOSFETs are in electric connection.

The source of the first MOSFET Q1 is electrically connected to the source of the second MOSFET Q2. Thus, when the absolute value of the negative voltage applied between the gate and the drain of the first MOSFET Q1 is larger than the absolute value of the negative threshold voltage of the first MOSFET Q1, or the absolute value of the negative voltage applied between the gate and the drain of the second MOSFET Q2 is larger than the absolute value of the negative threshold voltage of the second MOSFET Q2, the drain and the source of the first MOSFET Q1 and the drain and the source of the second MOSFET Q2 are in electric connection. The drain of the first MOSFET Q1 is electrically connected to the first output terminal 51 of the main battery 50 via an inductor L1. The drain of the second MOSFET Q2 is connected to an electric output terminal 61 of the first control circuit 60. The electric output terminal 61 of the first control circuit 60 is electrically connected to an electric input terminal 11 of the portable computer 10. When the first and the second MOSFETS Q1, Q2 are turned on, the main battery 50 supplies electric power to the portable computer 10 via the electric output terminal 61 of the first control circuit 60.

The third MOSFET Q3 is an N-channel enhancement mode MOSFET. The N-channel enhancement mode MOSFET is different from the P-channel enhancement mode MOSFET in that it requires a positive threshold voltage, and the N-channel enhancement mode MOSFET turns on when a positive voltage applied between the gate and the source of the N-channel enhancement mode MOSFET is larger than the threshold voltage of the N-channel enhancement mode MOSFET. The gate of the third MOSFET Q3 is electrically connected to the second output terminal 52 of the main battery 50.

The first resistor R1 has one end electrically connected to the gate of the third MOSFET Q3 and another end connected to ground. The source of the third MOSFET Q3 is connected to ground. The drain of the third MOSFET Q3 is electrically connected to the gate of the first MOSFET Q1, with a second junction 62 formed between the drain of the third MOSFET Q3 and the gate of the first MOSFET Q1. The second resistor R2 has one end electrically connected to a direct current source VDD and another end electrically connected to the second junction 62. The direct current source VDD can output a voltage lower than an output voltage of the backup battery 70. The direct current source VDD can be an output end of a buck circuit connected to the backup battery 70. The gate of the second MOSFET Q2 is electrically connected to the charging circuit 30. When the portable computer 10 is electrically connected to the AC power source 20 through an AC adapter to get power and the main battery 50 is installed in the first trough of the potable computer 10, the main battery 50 is controlled to be charged or not charged by the embedded controller 40 via the charging circuit 30. More specifically, the embedded controller 40 reads the remaining capacity of the main battery 50 from the fourth and fifth electric pins of the main battery 50. If the remaining capacity of the main battery 50 is lower than a predetermined threshold value, the embedded controller 40 controls the charging circuit 30 to charge the main battery 50.

Referring to FIG. 3, the second control circuit 80 includes a fourth and a fifth MOSFETs Q4, Q5 electrically connected to the first junction 73, a sixth and a seventh MOSFETs Q6, Q7 electrically connected to the second output terminal 52 of the main battery 50, a third resistor R3 and a fourth resistor R4. The fourth and the fifth MOSFETs Q4, Q5 are both P-channel enhancement mode MOSFETs. The drain of the fourth MOSFET Q4 is electrically connected to the first junction 73 via an inductor L2. The source of the fourth MOSFET Q4 is electrically connected to the source of the fifth MOSFET Q5. The drain of the fifth MOSFET Q5 is connected to an electric output terminal 81 of the second control circuit 80. The electric output terminal 81 of the second control circuit 80 is electrically connected to the electric input terminal 11 of the portable computer 10. When the fourth and the fifth MOSFETS Q1, Q2 are turned on, the backup battery 70 can supply electric power to the portable computer via the electric output terminal 81 of the second control circuit 80.

The gate of the fifth MOSFET Q5 is electrically connected to the charging circuit 30. When the portable computer is electrically connected to the AC power source 20 to get power and the backup battery 70 is installed in the second trough of portable computer, the backup battery 70 is controlled to be charged or not charged by the embedded controller 40 via the charging circuit 30. More specifically, the embedded controller 40 reads the remaining capacity of the backup battery 70 from the fourth and fifth electric pins of the backup battery 70. If the remaining capacity of the backup battery 70 is lower than a predetermined threshold value, the embedded controller 40 controls the charging circuit 30 to charge the backup battery 70.

The sixth and the seventh MOSFETs Q6, Q7 are both N-channel enhancement mode MOSFETs. The gate of the sixth MOSFET Q6 is electrically connected to the second output terminal 52 of the main battery 50. The source of the sixth MOSFET Q6 is connected to ground. The drain of the sixth MOSFET Q6 is electrically connected to the gate of the seventh MOSFET Q7 to form a third junction 82 between the drain of the sixth MOSFET Q6 and the gate of the seventh MOSFET Q7. The third resistor R3 has one end electrically connected to the direct current source VDD and another end electrically connected to the third junction 82. The source of the seventh MOSFET Q7 is connected to ground. The drain of the seventh MOSFET Q7 is electrically connected to the gate of the fourth MOSFET Q4 to from a fourth junction 83 between the drain of the seventh MOSFET Q7 and the gate of the fourth MOSFET Q4. The fourth resistor R4 has one end connected to the direct current source VDD, and another end connected to the fourth junction 83.

When used, the main battery 50 and the backup battery 70 are installed in the first and the second troughs of the portable computer 10, respectively, and both of the first and second output terminals 51, 52 of the main battery 50 output a high level voltage. Since the gate of the third MOSFET Q3 is connected to the second output terminal 52 of the main battery 50, the gate of the third MOSFET Q3 is at high potential, a positive voltage applied between the gate and the source of the third MOSFET Q3 is higher than the threshold voltage of the third MOSFET Q3, and the third MOSFET Q3 is turned on according to the characteristic of such N-channel enhancement mode MOSFET. When the third MOSFET Q3 is turned on, the second junction 62 and ground are in electrical connection through the drain and the source of the third MOSFET Q3, and the gate of the first MOSFET Q1 is at a low potential. Thus, a negative voltage is applied between the gate and the drain of the first MOSFET Q1, and the first MOSFET Q1 is turned on according to the characteristic of such P-channel enhancement mode MOSFET. Accordingly, the first output terminal 51 of the main battery 50 and the electric output terminal 61 of the first control circuit 60 are electrically connected, and the main battery 50 supplies a constant electric current to the portable computer 10.

Simultaneously, since the gate of the sixth MOSFET Q6 is connected to the seventh pin 52 of the main battery 50, the sixth MOSFET Q6 is turned on in much the same way as the third MOSFET Q3, as described above. When the sixth MOS- FET Q6 is turned on, the third junction 82 and ground are in electrical connection through the drain and the source of the sixth MOSFET Q6. Thus the gate of the seventh MOSFET Q7 is at a low potential. The seventh MOSFET Q7 is turned off. Since the direct current source VDD and the fourth resistor R4 connected with the gate of the fourth MOSFET Q4 and the seventh MOSFET Q7 is turned off, a high potential is formed at the gate of the fourth MOSFET Q4, and the fourth MOSFET Q4 is turned off. Accordingly, an open loop is formed between the first and second output terminals 71, 72 of the backup battery 70 and the electrical output terminal 81 of the second control circuit 80. The backup battery 70 cannot supply electric current to the portable computer 10 under the control of the second control circuit 80.

When the remaining capacitor of the main battery 50 is lower than the predetermined value, a user is warned of a low battery condition by the portable computer 10. At this time, due to the presence of the power supply circuit, the user can draw the main battery 50 out of the first trough of the portable computer 10 directly without a computer system of the portable computer 10 being shut down, with the backup battery 70 supply of electric power to the portable computer 10 being automatically changed from supply by the main battery 50 to supply by the backup battery 70. The working principle of the power supply circuit will be described in detail hereinafter.

Since the second output terminal 52 of the main battery 50 is shorter than the first output terminal 51 of the main battery 50, when the main battery 50 is drawn out of the portable computer 10, a disconnection between the second output terminal 52 and the portable computer 10 is effected earlier than a disconnection between the first output terminal 51 and the portable computer 10. Thus a time difference between the two disconnections is necessarily established.

During the period of this time difference, the second output terminal 52 of the main battery 50 is changed to output a low voltage, while the first output terminal 51 of the main battery 50 maintains outputting the low voltage. Since the second output terminal 52 of the main battery 50 is connected to the gate of the third MOSFET Q3, the gate of the third MOSFET Q3 is at a low potential. Thus the third MOSFET Q3 is turned off. The first resistor R1 can ensure that the low potential is formed at the gate of the third MOSFET Q3, to make it certain that the third MOSFET Q3 is turned off correctly. Since the direct current source VDD and the second resistor R2 are connected with the gate of the first MOSFET Q1 and the third MOSFET Q3 is turned off, a high potential is formed at the gate of the first MOSFET Q1. Thus, the first MOSFET Q1 is turned off. When the first MOSFET Q1 is turned off, the drain and the source of the first MOSFET Q1 and the drain and the source of the second MOSFET Q2 are not in electrical connection. An open loop is accordingly formed between the first output terminal 51 of the main battery 50 and the electric output terminal 61 of the first control circuit 60. Thus, during this time period, the main battery 50 is controlled by the first control circuit 60 to not supply electric power to the portable computer 10.

Simultaneously, during this time period, since the second output terminal 52 of the main battery 50 output the low voltage, the gate of the sixth MOSFET Q6 is at a low potential. The sixth MOSFET Q6 is turned off. When the sixth MOSFET Q6 is turned off, the drain and the source of the sixth MOSFET Q6 are not in electrical connection. Thus, the gate of the seventh MOSFET Q7 is at a high potential, and the seventh MOSFET Q7 is turned on. When the seventh MOSFET Q7 is turned on, the fourth junction 83 is connected to ground via the drain and the source of the seventh MOSFET Q7. Thus, the gate of the fourth MOSFET Q4 is at a low potential, and the fourth MOSFET Q4 is turned on. When the fourth MOSFET Q4 is turned on, a connection is formed between the first and second output terminals 71, 72 of the backup battery 70 and the electric output terminal 81 of the second control circuit 80. Thus, the backup battery 70 is controlled by the second control circuit 80 to supply a constant electric current to the portable computer 10 instead of the main battery 50.

According to above-described operation, when the main battery 50 is drawn out of the portable computer 10, the first control circuit 60 changes control of the main battery 50 from the main battery 50 supplying electric power to the portable computer 10 to not supplying electric power to the portable computer 10. Then instantaneously, the second control circuit 80 changes control of the backup battery 70 from the backup battery 70 not supplying electric power to the portable computer 10 to supplying electric power to the portable computer 10. Thus, the portable computer 10 including the power supply circuit allows users to draw the main battery 50 out of the portable computer 10 while the computer system is still operating.

It is to be understood, however, that even though numerous characteristics and advantages of the disclosure have been set forth in the foregoing description, together with details of the structures and functions of the embodiment(s), the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A power supply circuit for supplying electric power to a portable computer, the power supply circuit comprising:
    a main battery comprising a first output terminal and a second output terminal, the second output terminal being shorter than the first output terminal;
    a first control circuit, wherein the first control circuit includes a first and a second P-channel enhancement mode MOSFETs and a third N-channel enhancement mode MOSFET, the drain of the first MOSFET is electrically connected to the first output terminal of the main battery, the source of the first MOSFET is electrically connected to the source of the second MOSFET, the drain of the second MOSFET is connected to an electric output terminal of the first control circuit, the gate of the third MOSFET is electrically connected to the second output terminal of the main battery, the source of the third MOSFET is connected to ground, and the drain of the third MOSFET is electrically connected to the gate of the first MOSFET;
    a backup battery comprising a first output terminal and a second output terminal; and
    a second control circuit being electrically connected to the first and the second output terminals of the backup battery and the second output terminal of the main battery;
    wherein when the main battery is drawn out of the portable computer, a disconnection between the second output terminal of the main battery and the portable computer is effected earlier than a disconnection between the first output terminal of the main battery and the portable computer to thus establish a time difference between the two disconnections, and during the period of this time difference, the main battery is controlled by the first control circuit to change from supplying electric power to the portable computer to not supplying electric power to the portable computer, and the backup battery is controlled by the second control circuit to change from not supplying electric power to the portable computer to supplying electric power to the portable computer.

2. The power supply circuit as described in claim 1, further comprising a charging circuit, wherein the gate of the second MOSFET is electrically connected to the charging circuit.

3. The power supply circuit as described in claim 1, wherein the first control circuit further comprises a first resistor, the first resistor having one end electrically connected to the gate of the third MOSFET and another end connected to ground.

4. The power supply circuit as described in claim 3, wherein the first control circuit further comprises a second resistor, the second resistor having one end electrically connected to a junction of the drain of the third MOSFET and the gate of the first MOSFET and another end electrically connected to a direct current source, the direct current source outputting a voltage lower than the output voltage of the backup battery.

5. A power supply circuit for supplying electric power to a portable computer, the power supply circuit comprising:
a main battery comprising a first output terminal and a second output terminal, the second output terminal being shorter than the first output terminal;
a first control circuit, being electrically connected to the first and the second output terminals of the main battery;
a backup battery comprising a first output terminal and a second output terminal; and
a second control circuit, wherein the second control circuit comprises a first and a second P-channel enhancement mode MOSFETs and a third and a fourth N-channel enhancement mode MOSFETs, the drain of the first MOSFET is electrically connected to both the first and the second output terminals of the backup battery, the source of the first MOSFET is electrically connected to the source of the second MOSFET, the drain of the second MOSFET is electrically connected to an electric output terminal of the second control circuit, the gate of the third MOSFET is electrically connected to the second output terminal of the main battery, the sources of the third and the fourth MOSFETs are connected to ground, the drain of the third MOSFET is electrically connected to the gate of the fourth MOSFET, and the drain of the fourth MOSFET is electrically connected to the gate of the first MOSFET,
wherein when the main battery is drawn out of the portable computer, a disconnection between the second output terminal of the main battery and the portable computer is effected earlier than a disconnection between the first output terminal of the main battery and the portable computer to thus establish a time difference between the two disconnections, and during the period of this time difference, the main battery is controlled by the first control circuit to change from supplying electric power to the portable computer to not supplying electric power to the portable computer, and the backup battery is controlled by the second control circuit to change from not supplying electric power to the portable computer to supplying electric power to the portable computer.

6. The power supply circuit as described in claim 5, wherein the second control circuit further comprises a first resistor, the first resistor having one end electrically connected to a junction of the drain of the third MOSFET and the gate of the fourth MOSFET and another end electrically connected to a direct current source, the direct current source being an output end of a buck circuit connected to the backup battery.

7. The power supply circuit as described in claim 6, wherein the second control circuit further comprises a second resistor, the second resistor having one end electrically connected to a junction of the drain of the fourth MOSFET and the gate of the first MOSFET and another end electrically connected to the direct current source.

8. The power supply circuit as described in claim 5, further comprising a charging circuit, the gate of the second MOSFET electrically connected to the charging circuit.

* * * * *